United States Patent [19]

Channing et al.

[11] 4,404,613

[45] Sep. 13, 1983

[54] DOUBLE SWITCH FUSE ASSEMBLY

[75] Inventors: Christopher P. Channing, Central Islip; William Z. Rovinsky, Old Bethpage, both of N.Y.

[73] Assignee: Flair Manufacturing Corp., Hauppauge, N.Y.

[21] Appl. No.: 270,245

[22] Filed: Jun. 4, 1981

[51] Int. Cl.³ .................... H02H 5/10

[52] U.S. Cl. .................... 361/104; 361/23; 361/31; 361/192; 361/189; 236/1 G; 126/285 B; 110/163

[58] Field of Search .................... 361/104, 22, 23, 31, 361/192, 189; 236/1 G; 126/286, 285 B, 46; 110/163

[56] References Cited

U.S. PATENT DOCUMENTS

| | | | |
|---|---|---|---|
| 3,959,984 | 6/1976 | Viasak | 361/104 X |
| 4,021,187 | 5/1977 | Schulte et al. | 126/285 B X |
| 4,039,123 | 8/1977 | Frankel | 126/285 B X |
| 4,087,045 | 5/1978 | Matthews | 236/1 G |
| 4,351,014 | 9/1982 | Schofield, Jr. | 361/104 X |

*Primary Examiner*—Patrick R. Salce
*Attorney, Agent, or Firm*—Leonard Belkin

[57] ABSTRACT

A control system for an automatic damper in a heat generation system. The damper is provided with a spring biasing arrangement to open the damper when the plant is generating heat to permit unobstructed discharge of the products of heat generation. A motor maintains the damper closed when no heat is being generated. Provision is made for disabling the control system permitting the damper to be opened by the spring and the heat generator to function normally when a malfunction occurs in a switch which normally performs in a safety capacity. Included in this arrangement is a fuse in a circuit which opens the circuit when the switch fails as the result of a short circuit or welding of the contacts. The circuit includes means for preventing short circuiting during normal operation.

5 Claims, 5 Drawing Figures

DOUBLE SWITCH FUSE ASSEMBLY

BACKGROUND OF THE INVENTION

This invention relates to an improved electrical control system which is particularly applicable to an automatic damper system in a fossil fuel fired heating plant.

In a typical such heating plant, a burner is controlled to operate whenever there is a call for heat and then shut down when the need for heat is satisfied. A thermostat would normally perform this control function.

The automatic system of the type herein described is designed to control the operation of a damper vane in the heating stack from the burner. When the burner is not in operation, the damper vane is maintained in a closed position to eliminate the so-called "chimney effect" whereby there is a steady flow of air through the burner and out the stack resulting in a steady loss of heat from the furnace.

When the thermostat calls for burner operation, the automatic damper system opens the heating stack by rotating or otherwise moving the vane to permit flow through the stack. At the end of the burning cycle, the vane is then moved back into the closed position, in some installations with a time delay to permit the complete elimination of the combustion products from the combustion chamber.

An automatic damper system of the type just described is shown in U.S. Pat. No. 4,039,123 in which the vane is maintained in an open position by a spring and held closed during the off part of the burning cycle by an electric motor. In this way, in the event of power or motor failure, the vane will be maintained in its open position, thereby insuring that no combustion products or fuel fumes will be trapped within the heating plant, the building or the residence.

An additional safety feature which is commonly incorporated into an automatic damper control system, including that of the system in the aforementioned patent, is an interlock switch which is directly actuated by the vane itself, so that when the vane is open, the switch is in one position, and when the vane is closed, the switch is in a second position. This switch, which may be referred to as an endswitch, has an override function, that is, regardless of the operation of the control system, if the switch indicates the vane is closed, even when the latter is supposed to be open, the electrical power to the burner will be interrupted.

The problem with the use of an endswitch performing such a function is that in time, as the system ages, or if the switch proves in use to be defective, the switch can fail to perform its override function.

SUMMARY OF THE INVENTION

In accordance with the principles of this invention, there is provided an improved safety feature for an automatic control system of general application but particularly useful in the control of dampers in heating systems.

In one preferred embodiment of this invention, there is provided an automatic control system for a valve or other control device, which is normally biased into a first position, a motor upon being energized for overcoming the bias and moving the valve into its second position, and a normally closed switch in series with the motor and a source of voltage for the motor for normally maintaining the valve in its second position. A second circuit in parallel with the above described circuit is also provided in which there is a control switch and an endswitch in series with the voltage source. The endswitch is mechanically coupled to the valve so that this switch is closed when the valve reaches its first position. In the normal operation of the control system, the control switch is closed when it is desired to carry out a function and to open the valve to permit the function to be carried out so there is provided circuitry in response to the closing of the control switch to open the normally closed switch described above. The function could be carried out by an actuating means. In accordance with the principles of this invention, there is provided a fuse common to both series circuits which destructs when the control switch is closed at a time when the endswitch is already closed, and an abnormal condition is otherwise indicated, causing excess current to flow through said fuse. As the valve is normally in its second position and the endswitch normally open when the control switch is open, the closing of the latter when the valve is in its second position and the endswitch is closed indicates a malfunction of the switch, i.e., a short circuit through the endswitch, and under these circumstances, it is the intention to disable the valve in its first position, bringing the control valve to its first position, permitting the function to be carried out under control of the control switch. By destruction of the fuse is meant herein to include the operation of such non-destructive fuses as circuit breakers.

In accordance with another preferred embodiment of the invention, the above described control system is adapted for use in an automatic damper control system for a fossil fuel heating system. The damper vane in the heat stack of a heating system is kept closed when no heat is being generated, and in this way, the heat contained within the furnace, for example, is conserved more effectively with convective flow of air through the system being blocked. The thermostat acts as the control switch, the function is heat generation, and the failure of the endswitch as evidenced by a short through it will result in the destruction of the fuse when the thermostat is closed. This system improves the reliability and safety factor in such systems and should encourage greater use of such systems which will result in greater energy savings for the economy as a whole in addition to the savings accruing to the property owner.

In still another preferred embodiment of this invention, failure of the endswitch by development of a short circuit therethrough results in disablement of the operation of the heating system either alone or along with disablement of the damper control system.

It is thus a principal object of this invention to provide an electrical control system with an improved safety feature which will disable the system when a malfunction occurs.

It is a further object of this invention to provide a control system for an automatic damper control in a fossil fuel heating system in which automatic disablement of the damper closing control is caused when a failure in a principal component of the system occurs.

These and other objects of this invention will hereinafter become readily apparent from the following description of preferred embodiments of this invention.

DESCRIPTION OF PREFERRED EMBODIMENTS

Figure 1:
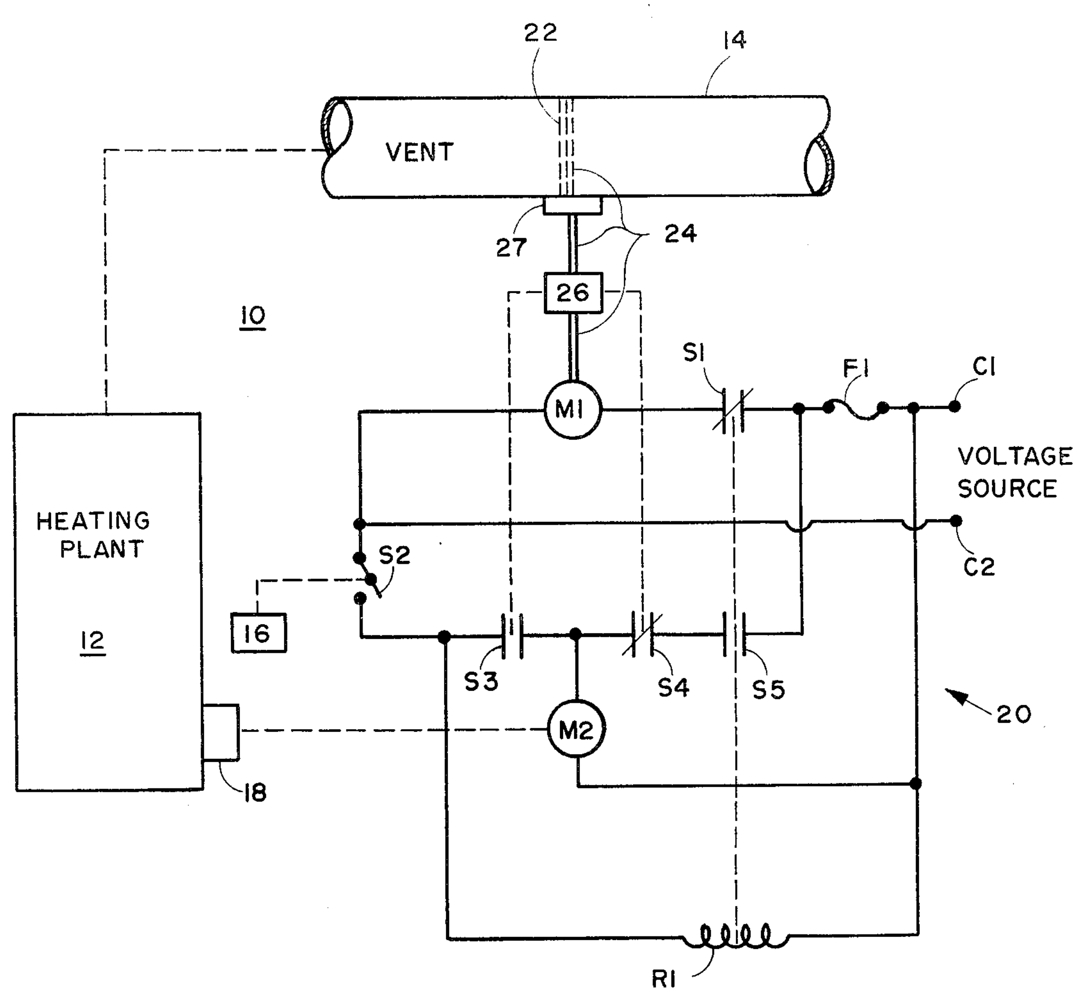
FIG. 1 shows a schematic illustration of a preferred embodiment of this invention, with the damper vane in closed position.
Figure 2:
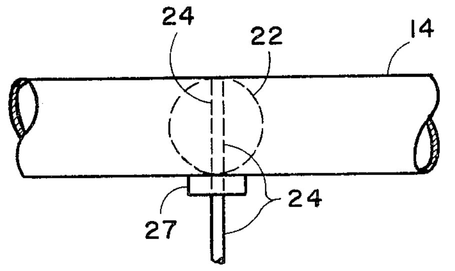
FIG. 2 shows the stack with the vane in its open position.

Referring to FIGS. 1 and 2, there is illustrated a gas fired hot air heating system 10 consisting of a heating plant 12 with a heating stack 14 for the safe discharge of the products of combustion, thermostat 16, and heating plant 12 provided with a gas valve 18. The arrangement described is equally applicable to an oil fired unit. Control system 20 embodying the principles of this invention is to be described further below.

Stack 14 is provided with a damper vane 22 shown in its closed position in FIG. 1 and fully open position in FIG. 2 mounted for rotation on a drive rod 24 upon which is also mounted an assembly 26 consisting of cams (not shown) for a purpose to be later described. Vane 22 is rotated by an electric motor $M_1$ connected to rod 24. A spring assembly 27 mounted on stack 14 attached to shaft 24 performs the function of biasing rod 24 so that vane 22 would be in its open position except when motor $M_1$ is energized. It is understood that stack 14 may be a vent or flue, also, as in some damper systems, vane 22 may be rotated in one direction only, moving 90° at a time between open and closed positions.

Heating Plant 12 contains as is understood in the art a combustion chamber (not shown) and provision (not shown) to supply heated water, steam, or air for domestic hot water and/or space heating. Thermostat 16 measures either air or water temperature, or steam pressure, depending on the type of heating system, and responds when the temperature or pressure drops below a predetermined value and calls for additional heating. Gas valve 18 actuated by a motor $M_2$ supplies the gas fuel to the burner in the combustion chamber of plant 12 when called for by thermostat 16. Not shown and not forming a part of this invention are the associated burner controls. When motor $M_2$ is energized, and gas valve 18 is actuated, burner operation and control would be initiated as is understood in the art. By motor, herein, is meant any electrically energized source of power including a solenoid.

Control system 20 consists of a first electrical circuit between contacts $C_1$ and $C_2$ across which is imposed a voltage source, typically a 120 or 24 volt A.C. supply. In this circuit there is fuse $F_1$, a relay actuated switch $S_1$, and motor $M_1$. Fuse $F_1$ may be either replaceable or non-replaceable, such as, but not limited to, a circuit breaker.

Parallel to motor $M_1$ and switch $S_1$ is a circuit consisting of thermostatically actuated switch $S_2$, an endswitch $S_3$, a safety switch $S_4$, and relay actuated switch $S_5$.

Switch $S_2$ is closed when thermostat 16 calls for heat, and is opened when the latter becomes satisfied, through the mechanical connection illustrated.

Switch $S_3$ is mechanically connected to cam assembly 26 on rod 24 so that it is closed only when vane 22 is in its almost or substantially fully open position, typically within ten degrees of the vane's fully open position. This switch provides for the energization of motor $M_2$ when vane 22 is moved into its open position as the result of closing of switch $S_2$.

Safety switch $S_4$ is also mechanically connected to cam assembly 26 so that this switch is closed only when vane 22 is in its closed position, typically again within about ten degrees of the vane's fully closed position.

In addition to the foregoing, there is provided a relay coil $R_1$ connected between one side of switch $S_2$ and contact $C_1$. Relay coil $R_1$ upon being energized, through a direct coupling to switches $S_1$ and $S_5$, opens the former and closes the latter. That is, when coil $R_1$ is not energized, as illustrated in FIG. 1, switch $S_1$ is closed and switch $S_5$ is in its open position.

The invention in this embodiment is designed to disable control system 20 in the event of a short in endswitch $S_3$ so that vane 22 will be left in its fully open position while permitting the normal thermostatic control and operation of heating plant 12.

In the operation of the system shown in FIGS. 1 and 2, thermostat 16 is satisfied, leaving switch $S_2$ open, relay coil $R_1$ not energized, switch $S_1$ closed and switch $S_5$ open. Vane 22 is in its closed position because of the energization of motor $M_1$, overcoming the bias of spring assembly 27. Motor $M_2$ is not energized because switches $S_3$ and $S_2$ are open, and heating plant 12 is in a quiescent state. Switch $S_5$ insures no current flow through motor $M_2$.

When thermostat 16 calls for more heat, switch $S_2$ is closed, causing relay coil $R_1$ to become energized, opening switch $S_1$ causing motor $M_1$ to deenergize with the result that spring assembly 27 opens vane 22 as shown in FIG. 2, thereby permitting combustion products from plant 12 to escape unobstructedly through stack 14. Safety switch $S_4$ opens as vane 22 starts to open and endswitch $S_3$ closes when vane 22 reaches a substantially fully open position so that burner motor $M_2$ energizes, opening gas valve 18 and starting the burning and heating cycle within plant 12. It is critical in normal operation that switch $S_4$ open before switch $S_3$ closes for reasons which will be described below. In the event that vane 22 is stuck in its closed position due to a malfunction anywhere, motor $M_2$ will not be energized because switch $S_3$ remains in open position and switch $S_4$ remains in its closed position.

When thermostat 16 becomes satisfied, opening switch $S_2$, system 20 reverts back to the state shown in FIG. 1, closing stack 14 by rotating vane 22 into its closed position. A time relay (not shown) in the circuit of motor $M_1$, may be employed to hold up the energization of motor $M_1$ for a preselected period of time to insure that all combustion products clear the furnace and stack after the burner shuts off.

In the event that endswitch $S_3$ fails and develops a short circuit through it, this switch will remain, in effect, in its closed position even though vane 22 moves to the position shown in FIG. 1. Switch $S_5$ is open due to the deenergization of relay coil $R_1$ and the system remains in its quiescent state. However, when thermostat 16 calls for more heat, in accordance with this invention, switch $S_2$ is closed, relay coil $R_1$ closes switch $S_5$ and there is a direct short between contacts $C_1$ and $C_2$ through fuse $F_1$ and switches $S_5$, $S_4$, $S_3$ and $S_2$ resulting in fuse $F_1$ to destruct or disconnect, thereby disabling control system 20. In effect, switch $S_4$ has acted as a check on switch $S_3$. On the other hand, in the event switch $S_4$ malfunctions and remains in its closed position, (i.e., shorted through), then the closing of switch $S_3$ as damper 22 opens will also cause fuse $F_1$ to destruct, and in effect, switch $S_3$ has acted in this case as a check on switch $S_4$. Thus, each of switches $S_3$ and $S_4$ acts as a check on the other, thereby increasing the overall reliability of the system.

When a failure as described occurs, spring assembly 27 will rotate vane 22 to its fully open position but the operation of heating unit 12 will continue normally as burner motor $M_2$ will continue to function in response to the operation of thermostat 16.

Provision may be made to have a light or other signal appear at the heating unit or other convenient location to show that fuse $F_1$ has destructed and that control over damper vane 22 is not being exercised. This will alert the operator that measures must be taken to return the system to its automatic operation.

The invention has been described in connection with its use in a gas or oil burner heating plant. In an oil or gas heated system employing hot water in a boiler for domestic water supply and/or space heating, thermostat 16 would measure boiler water temperature. Further, instead of a thermostat, a manual or other type of control could be used to operate switch $S_2$.

The principles of this invention could be adapted to terminate operation of the burner system instead of, or in addition to, disablement of the system controlling damper operation.

Figure 3:
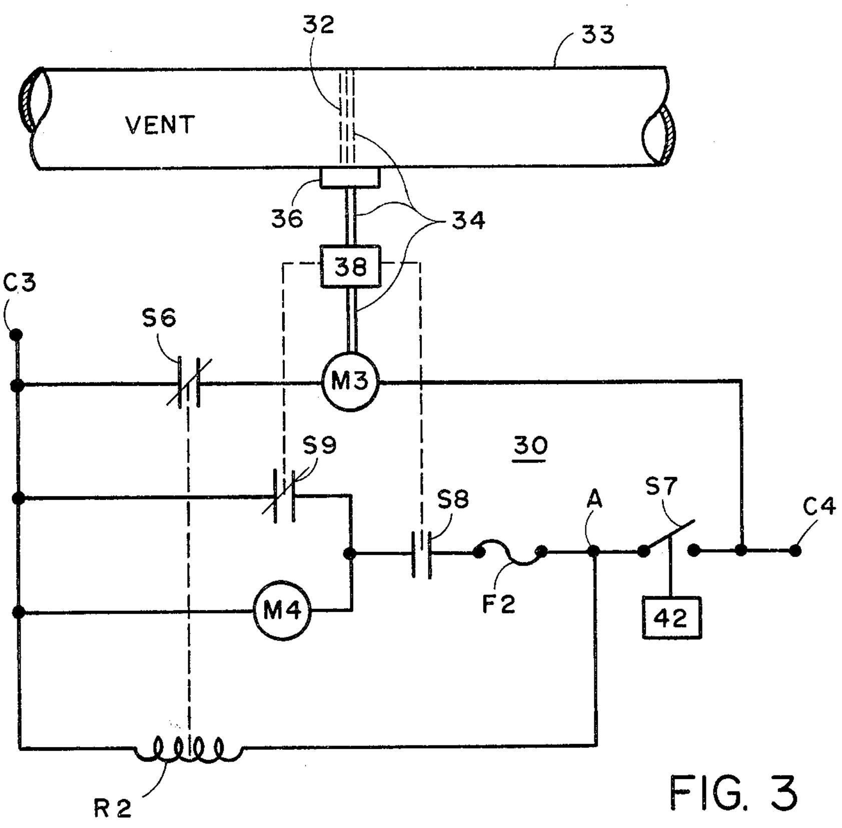
FIGS. 3, 4 and 5 show schematic illustrations of alternative embodiments.

Referring to FIG. 3, there is shown a control system 30 for controlling damper vane 22 in a heating stack 33. Vane 32 is mounted on a drive rod 34 having a return spring assembly 36 and a cam assembly 38. Motor $M_3$ upon energization closes and maintains vane 32 in the closed position. A relay actuated switch $S_6$ normally closed completes the circuit with motor $M_3$ between contacts $C_3$ and $C_4$ connected across a voltage source.

In parallel with motor $M_3$ and switch $S_6$ across contacts $C_3$ and $C_4$ is a circuit consisting of thermostatically controlled switch $S_7$, fuse $F_2$, an endswitch $S_8$, and a parallel circuit of safety switch $S_9$ and motor $M_4$. The latter energizes the heating plant which is not illustrated.

Switches $S_8$ and $S_9$ are linked to cam assembly 38 so that when damper vane 32 is substantially fully open endswitch $S_8$ is closed and when vane 32 is substantially fully closed switch $S_9$ is closed.

Relay coil $R_2$ is connected as shown across contact $C_3$ and thermostatically controlled switch $S_7$ at point A. Switch $S_6$ is coupled to relay coil $R_2$ so that upon actuation of the latter, the former is opened.

In the operation of the circuit shown in FIG. 3, thermostat 42 is satisfied so that switch $S_7$ is open. Switch $S_6$ is in the closed position with the result that motor $M_3$ is energized and vane 32 is being held in its closed position. Switch $S_8$ is open and switch $S_9$ is closed.

When switch $S_7$ is closed upon the call for heat by thermostat 42, coil $R_2$ is energized, opening switch $S_6$, causing vane 32 to open as a result of the action of spring assembly 36 with motor $M_3$ deenergized. As vane 32 starts to open, safety switch $S_9$ is opened and then when vane 32 reaches a substantially fully opened position switch $S_8$ closes. It should be noted at this point, while it is desirable to have safety switch $S_9$ closed only with vane 32 closed or almost fully closed (within manufacturing tolerances), and switch $S_8$ closed fully with vane 32 open or almost fully open (within manufacturing tolerances), it is critical that as vane 32 opens switch $S_9$ must open before endswitch $S_8$ closes. This is to prevent a short circuit and destruction of fuse $F_2$ during normal operation.

When switch $S_8$ closes, motor $M_4$ energizes which would initiate the burning cycle. If switch $S_8$ had malfunctioned and there was a short circuit through the switch, then upon the closing of switch $S_7$ excessive current would flow through the circuit consisting of switches $S_9$, $S_8$, fuse $F_2$ and switch $S_7$, resulting in the destruction of fuse $F_2$. This would result in a power loss to motor $M_4$ and its deenergization. Coil $R_2$ would remain energized with the switch $S_6$ open and vane 32 left in its open position until or in the event the thermostat became satisfied; an unlikely situation in the absence of burner operation. In this embodiment, the heating cycle could not be initiated until fuse $F_2$ were replaced or reset following correction of the malfunction.

Figure 4:
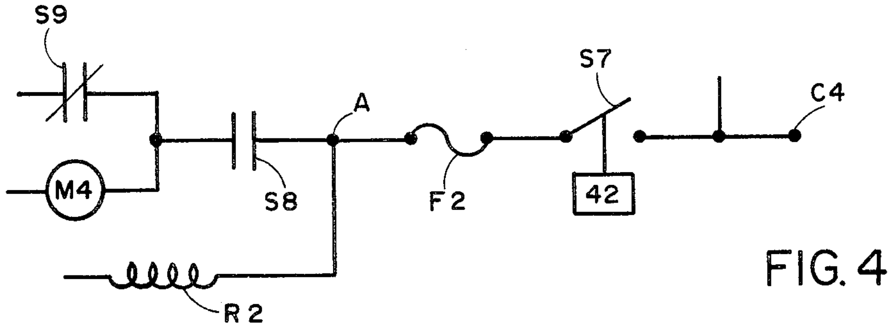
Figure 5:
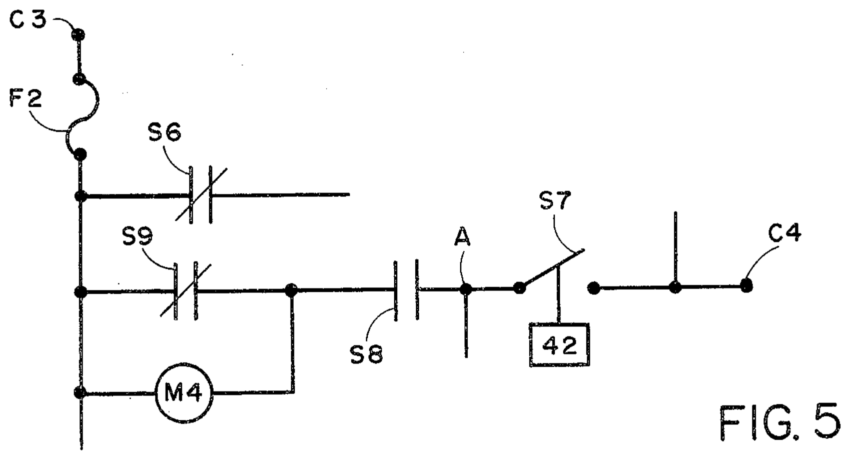

If fuse $F_2$ were located between point A in the circuit and switch $S_7$, as shown in FIG. 4, then coil $R_2$ would remain deenergized and vane 32 would remain closed until the circuit was repaired. With fuse $F_2$ located adjacent contact $C_3$ as shown in FIG. 5, the destruction of the former as a result of the overload would terminate energization of all the circuits.

It should be apparent that the circuits described are useful as well in situations other than heating stack damper controls. The burner motor could be any load which can be operated when a certain state or condition represented by vane 22 or 32 is satisfied. For example, the control of an appliance or an industrial process might depend on whether some other condition exists or whether some other function is being properly carried out, and the control system herein described is a simple and reliable way of exercising such control.

While the invention has been described in terms of one or more embodiments it is readily seen that a variety of modifications and other embodiments could be employed without departing from the principles of this invention. Accordingly, it is understood that the invention is not to be limited to the specific embodiments herein described.

What is claimed is:

1. In an automatic control system for a heating plant having a burner, first motor means for supplying fuel to said burner, and a heating stack for discharging the products of combustion, said heating stack containing a damper vane moveable between a closed position wherein said stack is closed to flow and an open position wherein said stack is open to flow, the improvement comprising means for mechanically biasing said damper vane into its open position, second motor means upon energization for overcoming said biasing means and moving and maintaining said damper vane into and in its closed position, voltage source means for energizing said motor means, a normally closed first switch and said second motor means forming a first series circuit connected to said voltage source means thereby normally maintaining said damper vane in its closed position, a normally open second switch, solenoid means in response to closing of said second switch for opening said first switch thereby causing deenergization of said second motor means and movement of said damper vane by its biasing means into its open position, a third switch mechanically linked to said damper vane to be closed only when said damper vane is substantially fully in its open position, said third switch and said second switch being in series with each other and forming part of a second series circuit connected to said voltage source means, both of said series circuits being in parallel with each other, means in response to closing of said second switch and movement of said damper vane from its closed position into its open position for causing closing of said third switch for energizing said first motor means, and fuse means destructing in response to closing of said second switch at a time when said third switch is short circuited through for at least partially disabling said control system.

2. The control system of claim 1 in which said fuse means upon its destruction disconnects only the first series circuit thereby permitting normal operation of said first motor means.

3. The control system of claim 1 in which said fuse means upon its destruction disconnects only said second series circuit thereby permitting the normal operation of said second motor means.

4. The control system of claim 1 in which said fuse means upon its destruction disconnects said second series circuit and said solenoid means thereby maintaining said second motor means in a state of energization.

5. The control system of claim 1 in which said fuse means upon its destruction disconnects both of said series circuits and said solenoid means.

* * * * *